(12) United States Patent
Lorey et al.

(10) Patent No.: US 11,827,127 B2
(45) Date of Patent: Nov. 28, 2023

(54) VEHICLE SEAT WITH SEAT DEPTH ADJUSTMENT

(71) Applicant: GRAMMER Aktiengesellschaft, Ursensollen (DE)

(72) Inventors: Konstantin Lorey, Schmidgaden (DE); Michael Klemm, Amberg (DE)

(73) Assignee: GRAMMER AKTIENGESELLSCHAFT, Ursensollen (DE)

( * ) Notice: Subject to any disclaimer, the term of this patent is extended or adjusted under 35 U.S.C. 154(b) by 0 days.

(21) Appl. No.: 17/875,709

(22) Filed: Jul. 28, 2022

(65) Prior Publication Data

US 2023/0029667 A1    Feb. 2, 2023

(30) Foreign Application Priority Data

Jul. 30, 2021    (DE) .......................... 102021119910.7

(51) Int. Cl.
| | |
|---|---|
| B60N 2/62 | (2006.01) |
| B60N 2/00 | (2006.01) |
| B60N 2/02 | (2006.01) |
| B60N 2/66 | (2006.01) |
| B60N 2/12 | (2006.01) |

(52) U.S. Cl.
CPC ...................................... *B60N 2/12* (2013.01)

(58) Field of Classification Search
CPC ................................ B60N 2/0284; B60N 2/62
See application file for complete search history.

(56) References Cited

U.S. PATENT DOCUMENTS

| | | | |
|---|---|---|---|
| 5,733,005 A | * | 3/1998 | Aufrere .................. B60N 2/169 297/340 |
| 7,669,929 B2 | | 3/2010 | Simon et al. |

(Continued)

FOREIGN PATENT DOCUMENTS

| | | |
|---|---|---|
| DE | 20111605 | 12/2001 |
| DE | 10306341 | 9/2003 |

(Continued)

OTHER PUBLICATIONS

Official Action with machine translation for German Patent Application No. 102021119910.7, dated Jul. 7, 2022, 10 pages.

(Continued)

*Primary Examiner* — Shin H Kim
(74) *Attorney, Agent, or Firm* — Sheridan Ross P.C.

(57) ABSTRACT

A vehicle seat is provided that has a seat part frame and a seat back adjustment with a seat depth adjustment element, where the seat back adjustment element can be displaced relative to the seat part frame, where a locking device locks a displacement of the seat depth adjustment element relative to the seat part frame by engaging at least one recess of the seat part frame, where the locking device includes a locking unit which has a first end on the seat depth adjustment element, and a second end, which can be deflected, the second end engaging the locking element in the recess in a non-deflected position and the locking element being separated from the recess in a deflected position and a sliding carriage element that deflects the second end of the locking unit when the sliding carriage element is displaced relative to the locking unit.

11 Claims, 8 Drawing Sheets

(56) References Cited

U.S. PATENT DOCUMENTS

| | | | |
|---|---|---|---|
| 7,871,126 B2 | 1/2011 | Becker et al. | |
| 7,909,401 B2 | 3/2011 | Hofmann et al. | |
| 8,011,728 B2 | 9/2011 | Kohl et al. | |
| 8,567,868 B2* | 10/2013 | Kuno | B60N 2/995 |
| | | | 297/423.36 |
| 8,998,320 B2* | 4/2015 | Mankame | B60N 2/919 |
| | | | 297/284.11 |
| 2009/0224584 A1* | 9/2009 | Lawall | B60N 2/0244 |
| | | | 297/311 |
| 2010/0109401 A1* | 5/2010 | Booth | B60N 2/62 |
| | | | 297/284.11 |
| 2011/0260506 A1* | 10/2011 | Kuno | B60N 2/995 |
| | | | 297/84 |
| 2012/0267928 A1* | 10/2012 | Mankame | B60N 2/0244 |
| | | | 297/284.4 |
| 2012/0267930 A1* | 10/2012 | Sharda | B60N 2/525 |
| | | | 297/313 |
| 2015/0202993 A1* | 7/2015 | Mankame | B60N 2/99 |
| | | | 297/284.4 |
| 2018/0244176 A1* | 8/2018 | Matsui | B60N 2/3075 |
| 2020/0108936 A1* | 4/2020 | Erb | B64D 11/0639 |
| 2023/0029667 A1* | 2/2023 | Lorey | B60N 2/0284 |

FOREIGN PATENT DOCUMENTS

| | | |
|---|---|---|
| DE | 102015201232 | 7/2016 |
| EP | 3254890 | 12/2017 |
| JP | S56-18812 | 2/1981 |
| KR | 10-1441558 | 9/2014 |
| KR | 10-1956264 | 3/2019 |
| KR | 10-2019-0057903 | 5/2019 |

OTHER PUBLICATIONS

Official Action (with English translation) for India Patent Application No. 202224043326, dated Feb. 14, 2023, 5 pages.

* cited by examiner

VEHICLE SEAT WITH SEAT DEPTH ADJUSTMENT

CROSS-REFERENCE TO RELATED APPLICATION

This application claims the benefit of German Patent Application No. 102021119910.7 filed Jul. 30, 2021, the contents of which are incorporated herein by reference in its entirety.

FIELD

The invention relates to a vehicle seat, the vehicle seat having a seat part frame and a seat depth adjustment with a seat depth adjustment element, the seat depth adjustment element being displaceable relative to the seat part frame, wherein a locking device is provided which is designed to lock a displacement of the seat depth adjustment element relative to the seat part frame by engagement of a locking element of the locking device in at least one recess of the seat part frame.

BACKGROUND

In the prior art, vehicle seats with seat depth adjustments are known to adjust the seat depth of a vehicle seat, in particular a seat surface on which a person can sit. The seat depth of the corresponding vehicle seats is adjusted by means of a displacement of the entire seat part, so that the position of the seat part in relation to a backrest is changed.

In doing so, the seat part itself is locked with respect to the seat frame by means of a locking mechanism.

SUMMARY

It is therefore an object of the present invention to provide a vehicle seat by means of which an enlargement of a seat surface of a seat part is possible, wherein a locking of the displacement is provided by a locking mechanism independent of the seat part.

This object is solved by a vehicle seat with the features of the claims. Advantageous embodiments of the invention can also be found in the claims.

A main idea of the present invention is to provide a vehicle seat, the vehicle seat having a seat part frame and a seat depth adjustment with a seat depth adjustment element, the seat depth adjustment element being displaceable relative to the seat part frame, wherein a locking device is provided which is designed to lock a displacement of the seat depth adjustment element relative to the seat part frame by engagement of a locking element of the locking device in at least one recess of the seat part frame, the locking device comprising a locking unit having a first end which is rigidly arranged on the seat depth adjustment element and a second end which is deflectable in a height direction, wherein in a non-deflected position the second end engages the locking element in the recess and in a deflected position the locking element is separated from the recess;

a sliding carriage element provided and adapted to deflect the second end of the locking unit upon displacement of the sliding carriage element relative to the locking unit.

The seat part frame is to be understood as a frame of a seat part, wherein the seat part represents the part of the vehicle seat on which a person can sit. Preferably, the seat part has a cushion and/or a cover on its upper side. The seat part is fixed in relation to the seat part frame, and the seat depth adjustment element is movable in relation to the seat part and the seat part frame.

According to the invention, the seat depth adjustment element is displaceable, preferably linearly displaceable, relative to the seat part frame. Preferably, the seat depth adjustment element is displaced along a displacement direction. The displacement is particularly preferred in such a way that the seat depth adjustment element can be displaced in a translatory manner. Preferably, the seat depth adjustment element is displaceable in a longitudinal direction, whereby the longitudinal direction can correspond to the longitudinal direction of the vehicle seat. By displacing the seat depth adjustment element relative to the seat part frame, the seat depth of the vehicle seat, in particular of the seat part, can be adjusted in that the seat surface can be changed by the seat depth adjustment element.

According to a preferred embodiment, a seat depth adjustment travel is up to 100 mm, more preferably 80 mm, and particularly preferably 60 mm. A seat depth adjustment travel means the distance by which the seat depth adjustment element can be displaced in relation to the seat part frame. This means that the seat depth adjustment element can assume a minimum displacement position and a maximum displacement position, whereby each position can be assumed between the displacement positions. Between the minimum and the maximum displacement position, the seat depth adjustment element covers the displacement path.

Particularly preferably, the seat depth adjustment element is made of a plastic, whereby preferably the seat depth adjustment element can be manufactured in an injection moulding process.

According to the invention, the locking device is provided comprising a locking unit and a locking element. It is particularly preferred that the locking element, which can engage in the recess, is arranged at the second end of the locking unit, preferably rigidly arranged.

According to the invention, it is provided that a displacement of the seat depth adjustment element is prevented when the locking element engages in one of the recesses. The locking unit is in the non-deflected position.

The first end of the locking unit is preferably arranged stationary in relation to the seat depth adjustment element by means of the rigid connection, whereby a rigid connection can advantageously be realised by means of a rivet connection, a screw connection or another connection method.

The second end of the locking unit, on the other hand, is at most in releasable contact with the seat part frame, in particular the recess, and can therefore be deflected at least in a height direction.

A height direction is preferably understood to be a direction perpendicular to the displacement direction, whereby the height direction can preferably correspond to the vehicle seat height direction. The displacement direction is preferably understood to be the direction in which the seat depth adjustment element can be displaced or displaced.

According to the invention, the locking element of the locking device engages in the recess in a non-deflected position in order to lock the displacement movement of the seat depth adjustment element relative to the seat part frame. If, on the other hand, the locking device is in a deflected position, the locking element no longer engages in the recess of the seat part frame. However, it should be noted that a deflected position means that the locking element no longer engages in the recess. If the locking device or the locking unit is transferred from a non-deflected to a deflected position by deflecting the second end, the locking element continues to engage in the recess, at least partially, so that the sliding movement continues to be locked. The locking element moves relative to the recess, whereby the extension of the locking element is such that an overlap of the locking element with the recess can continue to exist during a deflection movement. In the deflected position, the locking element is completely moved out of the recess, so that the locking element is arranged above the recess as seen in the height direction.

According to a preferred embodiment, the second end of the locking device in particular can be deflected more easily if the locking device is at least partially elongated. Advantageously, the elongated locking unit extends in the direction of the displacement direction.

An elongated design is understood to mean that the longitudinal extension of the locking device is large compared to the height extension and the width extension of the locking device. It is therefore possible to deflect the second end of the locking device more easily by means of the elongated design of the locking device. By extending it in the direction of adjustment, the force required for deflection can be reduced.

Particularly preferably, it can be provided that in the non-deflected position the first end of the locking unit is above the second end of the locking unit as seen in height direction.

Particularly preferably, the first end of the locking unit and the second end of the locking unit can be connected by means of a U-shaped connection, wherein a first leg of the U-shaped connection comprises the first end of the locking unit and a second leg of the U-shaped connection comprises the second end of the locking unit. Particularly preferably, the first leg is shorter than the second leg.

According to a preferred embodiment, the locking device can be structurally simplified if the locking device is at least partially elastically deformable.

Elastic deformation is particularly desirable in the height direction.

According to a preferred embodiment, it is advantageous if the locking unit consists at least partially of a spring sheet and/or a spring steel. Particularly advantageously, the locking element of the locking device consists of a material which is rigid or stiff. According to a preferred embodiment, the locking unit is formed as a leaf spring element.

By designing the locking unit at least partially with a spring plate and/or a spring steel, the locking unit can be designed to be elastically deformable while at the same time minimising the manufacturing costs by saving on materials and components.

It is further provided according to the invention that the locking device comprises the sliding carriage element, which is provided and designed in such a way that the second end of the locking unit can be deflected when the sliding carriage element is displaced relative to the locking unit.

This means that the second end of the locking unit can only be deflected when the sliding carriage element is moved relative to the locking unit.

In particular, it is preferred that the sliding carriage element is displaceable relative to the seat depth adjustment element as well as relative to the seat part frame when the locking device is actuated.

Particularly preferably, the sliding carriage element is connected to the seat depth adjustment element in such a way that when the seat depth adjustment element is displacable relative to the seat part frame, the sliding carriage element can be displaced in the same way as the seat depth adjustment element. Thus, if the locking device is actuated and the seat depth adjustment element is displaceable relative to the seat part frame, the sliding carriage element is also displaced correspondingly with the seat depth adjustment element, so that a relative position of the sliding carriage element to the locking unit is unchanged.

According to a particularly preferred embodiment, it is therefore provided that the locking device comprises an actuating unit, wherein the sliding carriage element is at least operatively connected to the actuating unit, wherein upon actuation of the actuating unit the sliding carriage element is displaceable relative to the locking unit.

According to a further embodiment, it is provided that in a normal position of the sliding carriage element, the second end is in the non-deflected position and when the sliding carriage element is displaced, the second end can be deflected. Preferably, a maximum displacement position is provided in which the displacement slide element cannot be displaced further, wherein in the maximum displacement position the second end of the locking unit is in the deflected position.

The normal position of the sliding carriage element thus corresponds to the non-deflected position of the locking unit, the maximum displacement position of the sliding carriage element corresponds to the deflected position in which the locking element no longer engages in the recess.

According to a preferred embodiment, it is provided that the actuating unit is rotatably connected to the seat depth adjustment element about a first rotation axis.

By rotating the actuating unit, the locking device can be actuated accordingly, namely that the sliding carriage element is displaced relative to the locking unit by the rotation of the actuating unit.

Particularly preferably, a first rotational position and a second rotational position of the actuation unit are provided, whereby in the first rotational position the sliding carriage element is in the normal position and in the second rotational position the sliding carriage element is in the maximum displacement position. The actuating unit can assume any possible rotational position or rotational position between the first rotational position and the second rotational position, which corresponds to a displacement of the sliding carriage element.

Particularly preferably, the actuating unit is arranged rotatably relative to the seat depth adjustment element in such a way that only the first rotational position, the second rotational position and the rotational positions between the first rotational position and the second rotational position can be assumed. This means that when assuming the first rotational position and the second rotational position, no further rotation in the same direction is possible.

According to a particularly preferred embodiment, it is provided that the locking unit has an opening through which a first inclined portion of the sliding carriage element extends, wherein preferably the locking unit has a second inclined portion which is contactable with the first inclined portion in such a way that upon displacement of the sliding carriage element the inclined portions move relative to each other.

In the normal position of the sliding carriage element, it is preferably provided that the first inclined portion and the second inclined portion are either arranged at a first distance from each other or that the inclined portions already contact each other. Particularly preferably, the inclined portions are arranged at the first distance so that small movements of the sliding carriage element due to small rotational movements of the actuating unit do not already result in a deflection of the second end of the locking unit.

Particularly preferably, the inclined parts are arranged essentially parallel to each other.

A sliding movement of the sliding carriage element moves the second inclined portion relative to the first inclined portion so that the first inclined portion moves along the first inclined portion so that the second inclined portion is guided by the first inclined portion and is moved according to the shape of the first inclined portion, thereby deflecting the second end of the locking unit. The first inclined portion therefore preferably describes a guide slot for the second inclined portion.

According to a further preferred embodiment, it is provided that a return element is provided which is designed to counteract the displacement of the sliding carriage element relative to the locking unit. Preferably, the return element can be used to return the sliding carriage element to the normal position, starting from a displacement position, i.e. a position displaced relative to the locking unit.

It is intended that when the actuating unit is turned, or turned to the maximum, the sliding carriage element can be moved automatically from the displaced position or the maximum displacement position to the normal position by means of the return element when the actuating unit is released. This means that the actuating unit does not need to be turned back.

According to a further preferred embodiment, it is provided that the return element is a tension spring which is connected to the seat depth adjustment element and the sliding carriage element. Preferably, the tension spring is connected to the seat depth adjustment element and the sliding carriage element in such a way that when the sliding carriage element is displaced relative to the locking unit, the tension spring is stretched so that the tension spring generates a counterforce which counteracts the movement of the sliding carriage element.

According to an alternative or cumulative embodiment, the return element is a compression spring connected to the seat depth adjustment element and the sliding carriage element. Preferably, the compression spring is connected to the seat depth adjustment element and the sliding carriage element in such a way that when the sliding carriage element is moved relative to the locking unit, the compression spring is compressed so that the compression spring generates a counterforce which counteracts the movement of the sliding carriage element.

According to a further embodiment, it is provided that the locking unit is enclosed by the sliding carriage element as seen in a width direction.

This makes it possible to build the locking device compactly.

Further advantageous embodiments result from the subclaims.

BRIEF DESCRIPTION OF THE DRAWINGS

Further aims, advantages and usefulness of the present invention are to be taken from the following description in connection with the drawing. The following are shown.

DETAILED DESCRIPTION

In the figures, the same components are to be understood with the corresponding reference signs. For the sake of clarity, some components may not have a reference sign in some of the figures, but have been designated elsewhere.

Figure 1A:
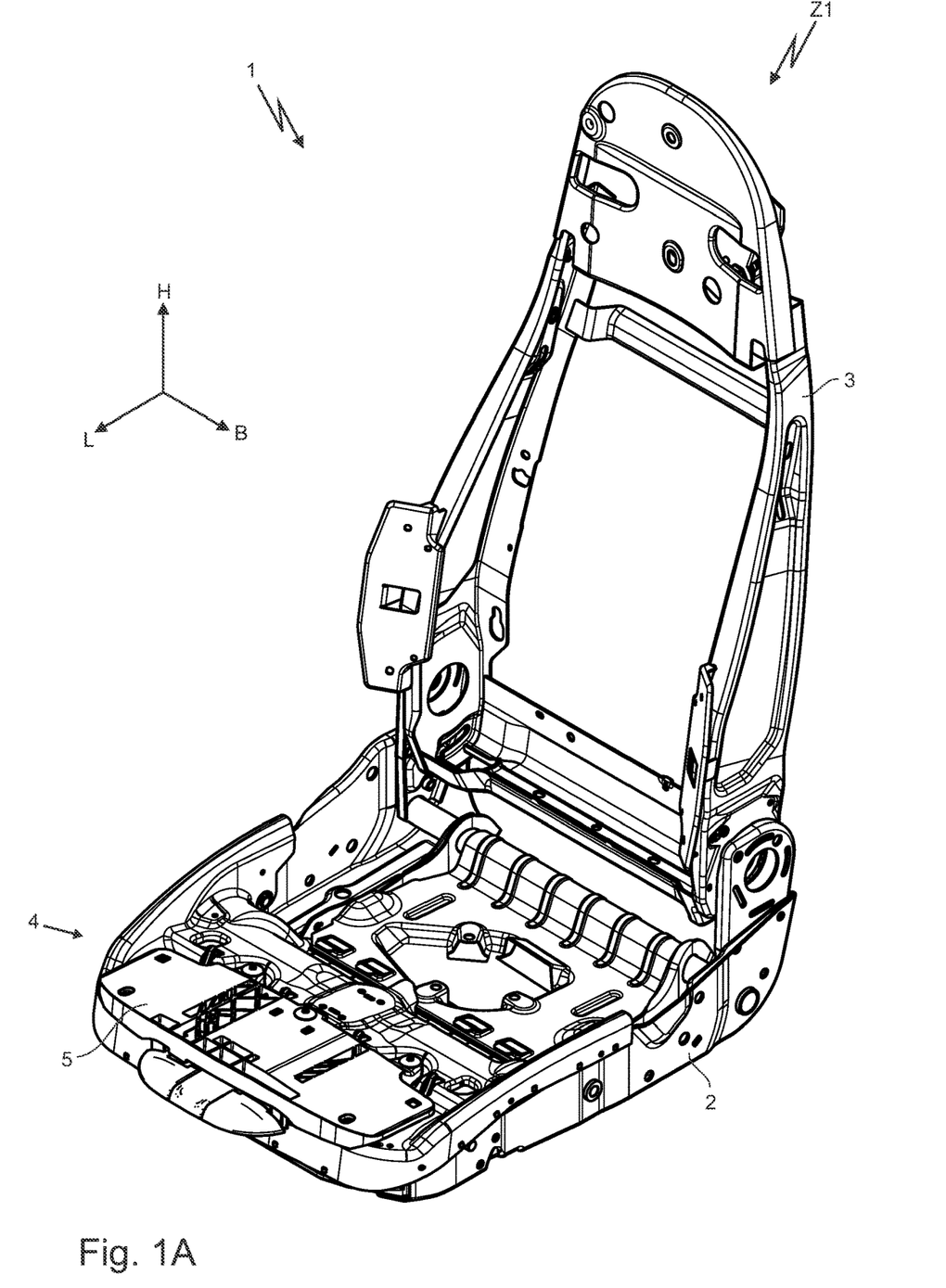
FIG. 1A Vehicle seat with seat depth adjustment according to a preferred embodiment in a first state.
Figure 1B:
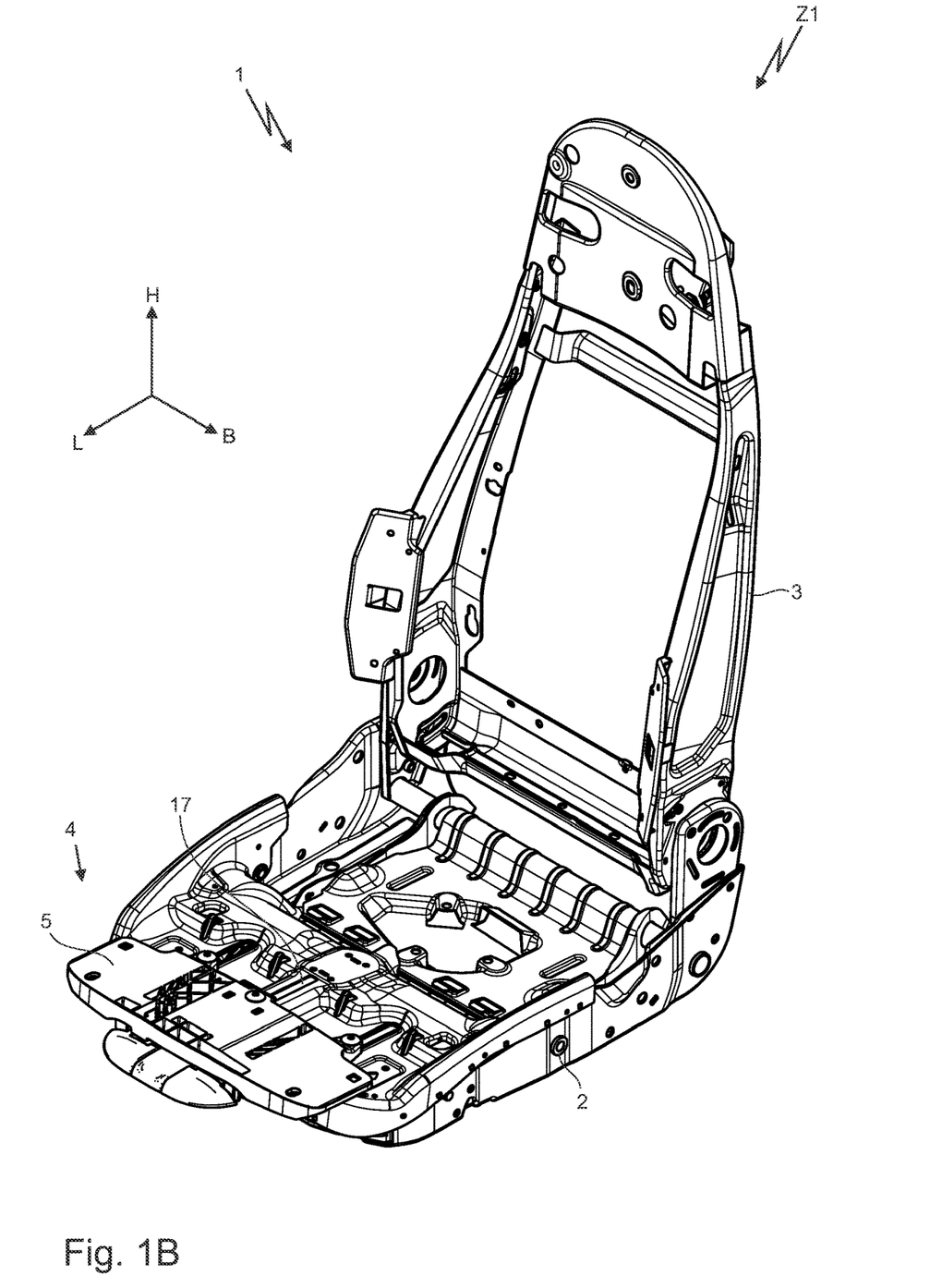
FIG. 1B Vehicle seat according to FIG. 1A in a second state.

In FIG. 1A a vehicle seat 1 according to a preferred embodiment is shown in a first state Z1 and in FIG. 1B in a second state Z2. The states Z1, Z2 refer to the position of a seat depth adjustment element 5 of a seat depth adjustment system 4, wherein the first state Z1 describes a state in which the seat depth adjustment element 5 is in its minimum position, i.e. in the position in which the available seat surface is minimum. Accordingly, the second state Z2 describes a state in which the seat depth adjustment element 5 is in its maximum position, i.e. in the position in which the available seat surface is at a maximum. The second state Z2 is achieved by a forward displacement of the seat depth adjustment element 5 in a longitudinal direction L, and the first state Z1 is achieved by a rearward displacement of the seat depth adjustment element 5 in the longitudinal direction L, wherein the seat depth adjustment element 5 is maximally rearwardly displaced in the first state Z1 and maximally forwardly displaced in the second state Z2. A displacement of the seat depth adjustment element is to be understood relative to a seat part frame 2.

The vehicle seat 1 has the seat part frame 2 and preferably a backrest frame 3. Furthermore, the vehicle seat 1 comprises the seat depth adjustment 4 with the seat depth adjustment element 5.

Preferably, it can be provided that the seat depth adjustment element 5 is formed at least partially complementary to the seat part frame 2, so that the guidance of the seat depth element 5 can be improved. Particularly preferably, it can be provided that a seat depth adjustment element guide 17 is provided, which is arranged centrally with respect to the seat depth adjustment element 5. Preferably, the seat depth adjustment element guide 17 is prism-shaped.

In the following figures, the locking device for locking the displacement of the seat depth adjustment element 5 relative to the seat part frame 2 is described in more detail.

Figure 2A:
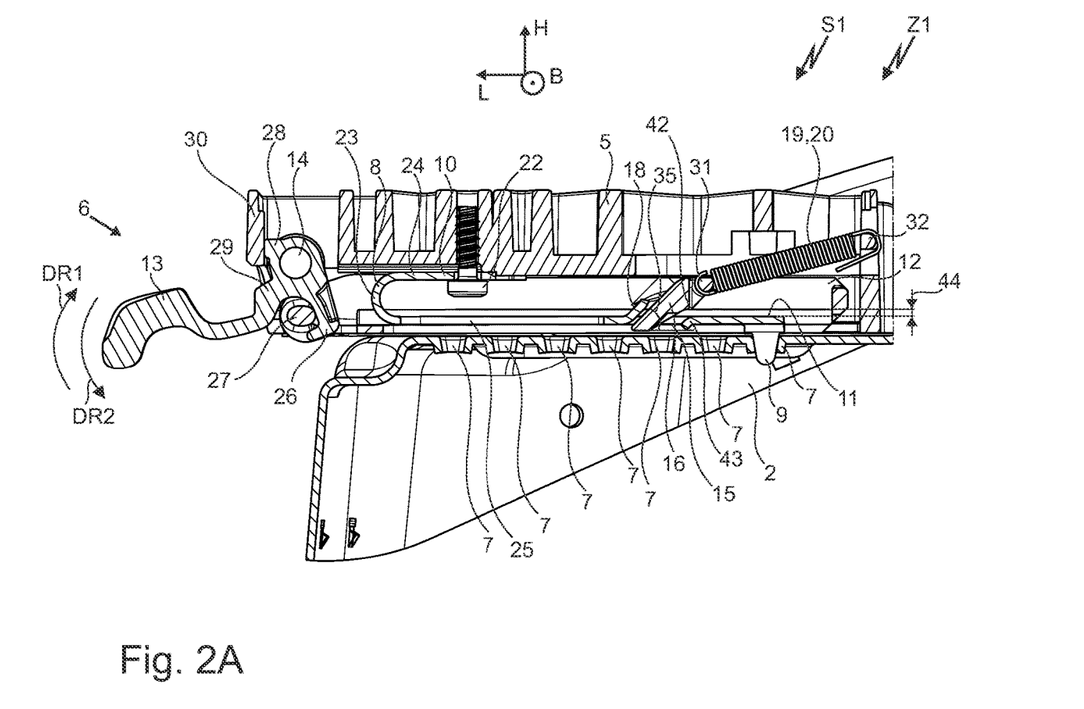
FIG. 2A Locking device in a non-deflected position in a sectional view according to a first embodiment.

In FIG. 2A the seat depth adjustment element 5 is shown in the first state Z1, i.e. the seat depth element 5 is in the rearmost position as viewed in longitudinal direction L.

Further, the locking device 6 is shown with a locking unit 8 and a locking element 9, wherein the locking unit 8 has a first end 10, which is rigidly connected to the seat depth adjustment element 5, preferably by means of a releasable connection, for example by means of a screw connection 22. The locking unit 8 has a second end 11, wherein the locking element 9 is arranged or fastened to the second end 11 of the locking unit 8.

The locking unit 8 comprises a U-shaped connection 23 having a first leg 24 and a second leg 25, the first leg 24 comprising or forming the first end 10 and the second leg 25 comprising or forming the second end 11. It is therefore possible to arrange the first end 10 above the second end 11, as seen in the height direction H, so that the locking device 6 can be constructed more compactly overall. Likewise, a deflection of the second end 11 is easier to perform, since an elastic deformation of the locking unit 8 can be easily performed due to the U-shaped connection 23.

According to FIG. 2A, a non-deflected position S1 is shown, i.e. the locking unit 8 is not deflected and the locking element 9 engages in a recess 7 of the seat part frame 2, so that a movement or displacement of the seat depth adjustment element 5 relative to the seat part frame 2 is locked.

The locking device 6 further comprises a sliding carriage element 12 which is actuatable by means of an actuating unit 13, the actuating unit 13 being connected to the seat depth adjustment element 5 so as to be rotatable about a first rotation axis 14. Actuation of the actuating unit 13 is a rotation of the actuating unit 13 about the first rotation axis 14. A rotation of the actuating unit 13 results in a displacement of the sliding carriage element 12, preferably along the displacement direction or the longitudinal direction L. The sliding carriage element 12 is mounted in such a way that a displacement of the sliding carriage element 12 relative to the seat depth adjustment element 5 and the locking unit 8 is possible. Particularly preferred is a displacement out of the normal position S1 in longitudinal direction L movement in such a way that the sliding carriage element 12 is pulled by the actuating unit 13.

Further, the sliding carriage element 12 is at least operatively connected to the actuating unit 13, so that a movement of the actuating unit 13 results in a movement of the sliding carriage element 12.

The actuating unit 13 and the sliding carriage element 12 are connected in such a way that when the actuating unit 13 is rotated in a first direction of rotation DR1, presently clockwise, the sliding carriage element 12 is moved forward in the longitudinal direction L, and that when the actuating unit 13 is rotated in a second direction of rotation DR2, presently counterclockwise, the sliding carriage element 12 is moved rearward in the longitudinal direction L.

Particularly preferably, the actuating unit 13 comprises a hooking element 26 which is contactable with a hooking element 27 of the sliding carriage element 12 upon a rotation in a direction of rotation DR1, DR2. Preferably, the hook element 26 is arranged extending downwards in height direction H starting from the first rotation axis 14. As a result, the sliding carriage element 12 is pulled forward in the longitudinal direction L during a rotation in the first direction of rotation DR1.

The rotation of the actuating unit 13 about the first rotation axis 14 is preferably limited by means of a first stop element 28 and a second stop element 29 of the actuating unit 13, which can be contacted with a stop 30 of the seat depth adjustment element 5. Preferably, the first stop element 28 is in contact with the stop 30 in the non-deflected position S1 and the second stop element 29 is in contact with the stop 30 in the deflected position S2.

According to the invention, it is provided that the sliding carriage element 12 is provided and configured to deflect the second end 11 of the locking unit 8 when the sliding carriage element 12 is displaced relative to the locking unit 8.

For this purpose, it is preferably provided that the sliding carriage element 12 comprises a first inclined portion 16 and the locking unit 8 comprises an opening 15, the first inclined portion 16 extending through the opening 15. Further, the locking unit 8 comprises a second inclined portion 18 which is arranged substantially parallel to the first inclined portion 16.

Further preferably, the inclined portions 16, 18 are non-contacting in the non-deflected position S1.

Particularly preferably, the locking device 6 comprises a safeguard against an undesired deflection of the locking unit 8 and accordingly an undesired release of the locking. For this purpose, as shown in FIG. 2A, a first safety stop 42 and a second safety stop 43 are provided, which are arranged one above the other as seen in the height direction H. The first safety stop 42 is a safety stop 43. The first safety stop 42 is part of the sliding carriage 12, preferably the inclined portion 16, and the second safety stop 43 is part of the locking unit 8. Preferably, the second safety stop 43 is formed as part of the opening 15, although other arrangements may also be possible. The stops 42, 43 are arranged at a distance 44 from each other, in height direction H. The distance 44 is such that, in the event of a slight deflection of the second end 11, the second safety stop 43 contacts the first safety stop 42 and accordingly prevents further movement in the height direction H. The distance 44 is dimensioned in such a way that the locking element 9 continues to engage in the corresponding recess 7 even during the slight deflection.

Particularly preferably, a return element 19 is also provided, wherein a first embodiment is shown in FIGS. 2A to 2F, wherein the return element 19 is designed as a tension spring 20, and wherein a second embodiment is shown in FIGS. 3A to 3F, wherein the return element 19 is designed as a compression spring 21.

With regard to the embodiment according to which the return element 19 is designed as a tension spring 20, a first attachment area 31 and a second attachment area 32 are provided by means of which the tension spring 20 can be connected to the sliding carriage element 12 and, on the other hand, to the seat depth adjustment element 5. In the non-deflected position S1 shown, the tension spring 20 is unloaded, i.e. there is no restoring force acting against the displacement of the sliding carriage element 12, so that the sliding carriage element 12 can be automatically displaced by the return element 19 into the normal position, and accordingly the locking unit back into the non-deflected position S1 starting from a deflected position S2, which is shown in FIG. 2B.

By an actuation of the actuation unit 13, i.e. a rotation in direction DR1, the sliding carriage element 12 is moved forward in longitudinal direction L and relative to the locking element 8, so that the inclined portions 16, 18 contact and the second inclined portion 18 is guided at the first inclined portion 16, so that the second end 11 is deflected in the height direction H, so that the locking element 9 moves out of the recess 7 into the deflected position S2, so that, seen in the height direction H, the locking element 9 is arranged completely above the recess 7, whereby a displacement of the seat depth adjustment element 5 relative to the seat part frame 2 is possible. Preferably, the inclined portions 16, 18 extend at a first angle 36 to the longitudinal direction L. Preferably, the first angle 36 is an acute angle. Preferably, the first inclined portion 16 extends from top to bottom through the opening 15.

Figure 2B:
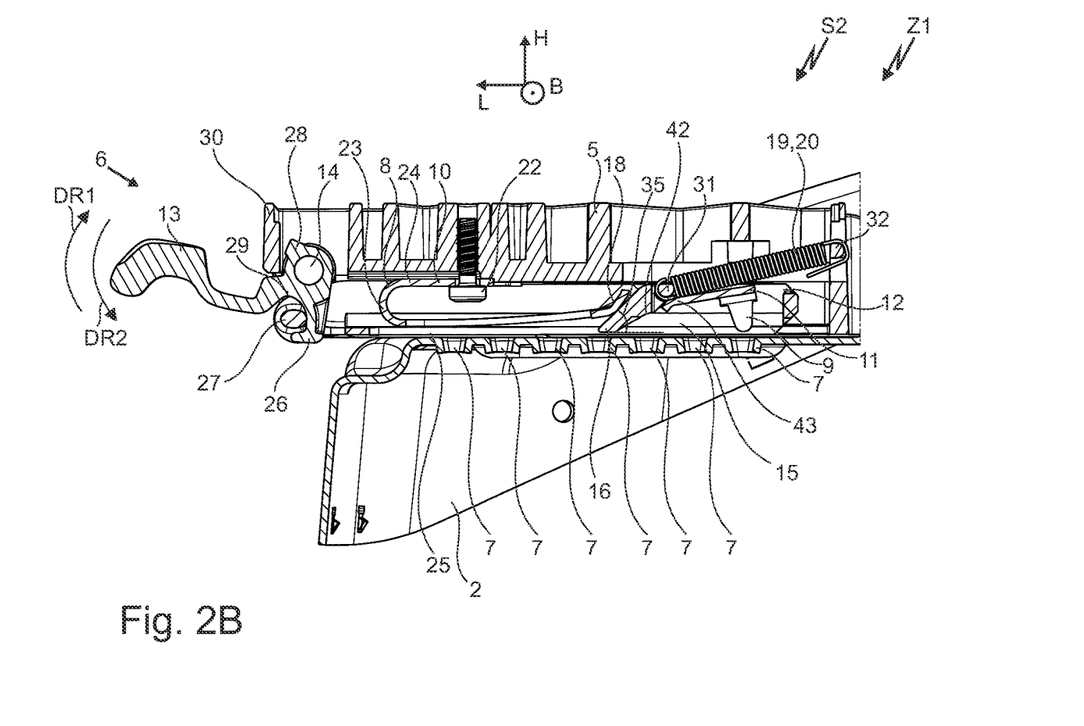
FIG. 2B Locking device according to FIG. 2A in a deflected position.

FIG. 2B shows all the elements of FIG. 2A with the locking unit 8 in the deflected position S2. Likewise, the sliding carriage element 12 is displaced, the actuating lever 13 is such that the second stop element 29 contacts the stop 30, and the tension spring 20 is stretched.

Figure 2C:
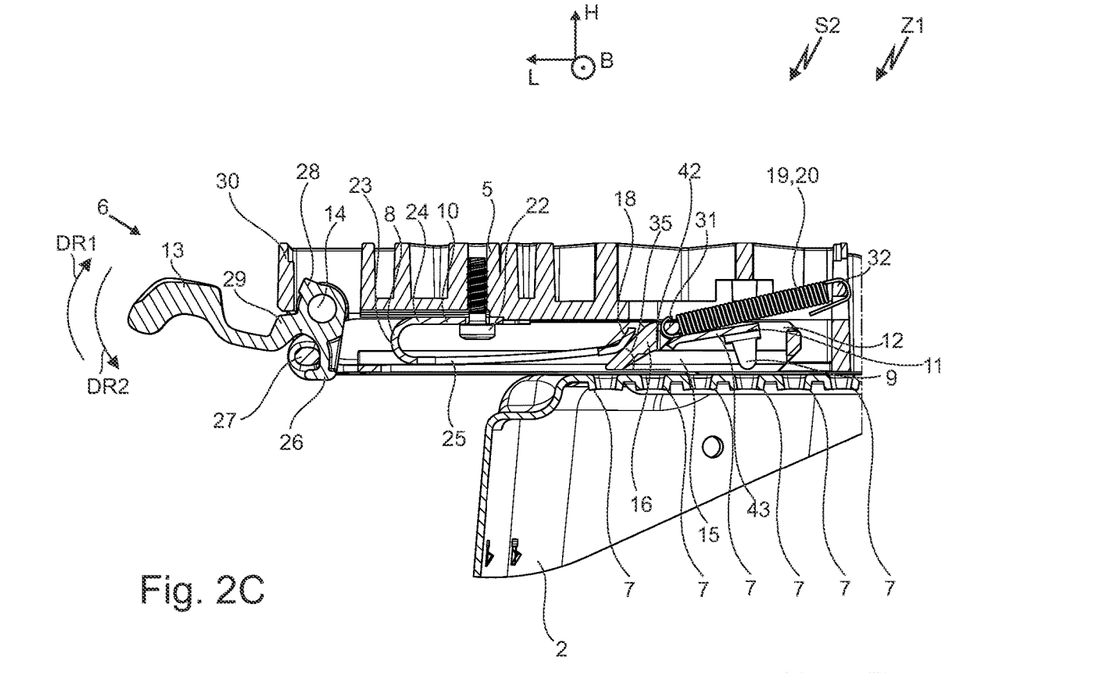
FIG. 2C Locking device according to FIG. 2B in a forward displaced position.

As a result of the fact that the locking element 9 no longer engages in the recess 7, the seat depth adjustment element 5 can be displaced forwards in the longitudinal direction L, whereby the actuating unit 13, the sliding carriage element 12 and the locking unit 8 move equally with the seat depth adjustment element 5 due to its arrangement relative to the seat depth adjustment element 5. A forward displaced position of the seat depth adjustment element 5 is shown in FIG. 2C.

Figure 2D:
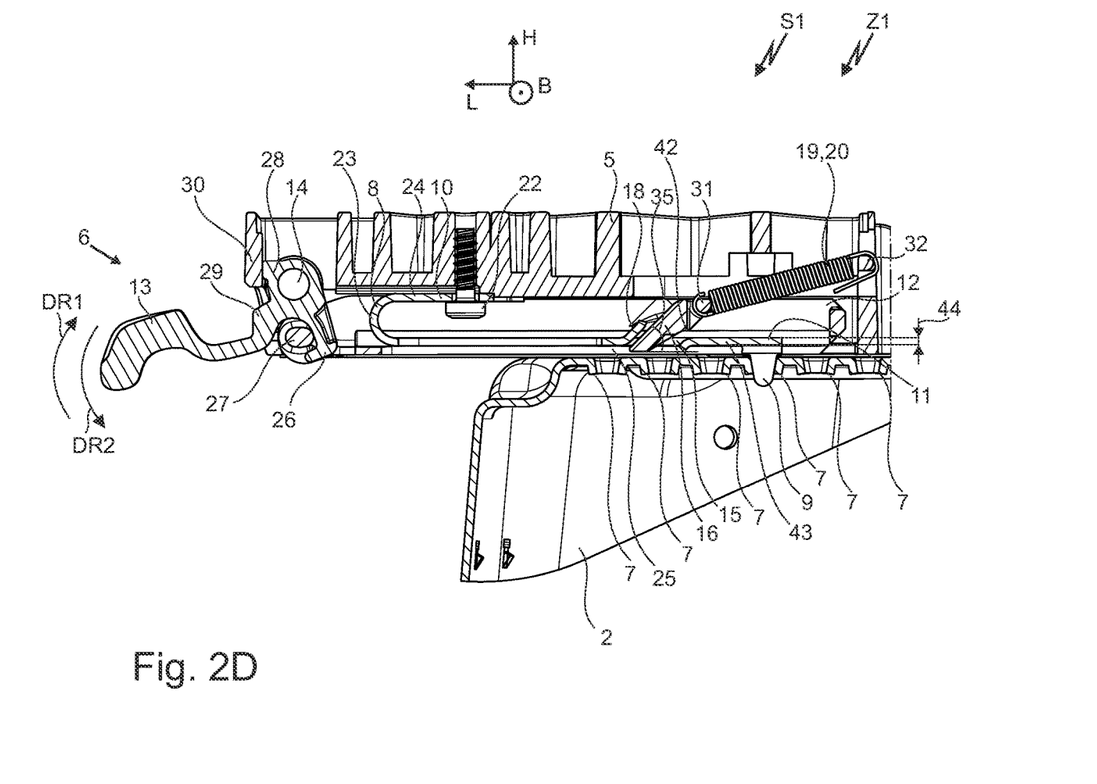
FIG. 2D Locking device according to FIG. 2C in a non-deflected position.

Once the desired position of the seat depth adjustment element 5 has been reached, the actuating unit 13 can be released so that the sliding carriage element 12 can be moved back to the normal position S1 by the stretched tension spring 20, whereby the locking unit 8 can be transferred from the deflected position S2 to the non-deflected position S1 and the locking element 9 engages in a further recess 7, whereby the displacement of the seat depth adjustment element 5 is again blocked. This is shown in FIG. 2D.

Figure 2E:
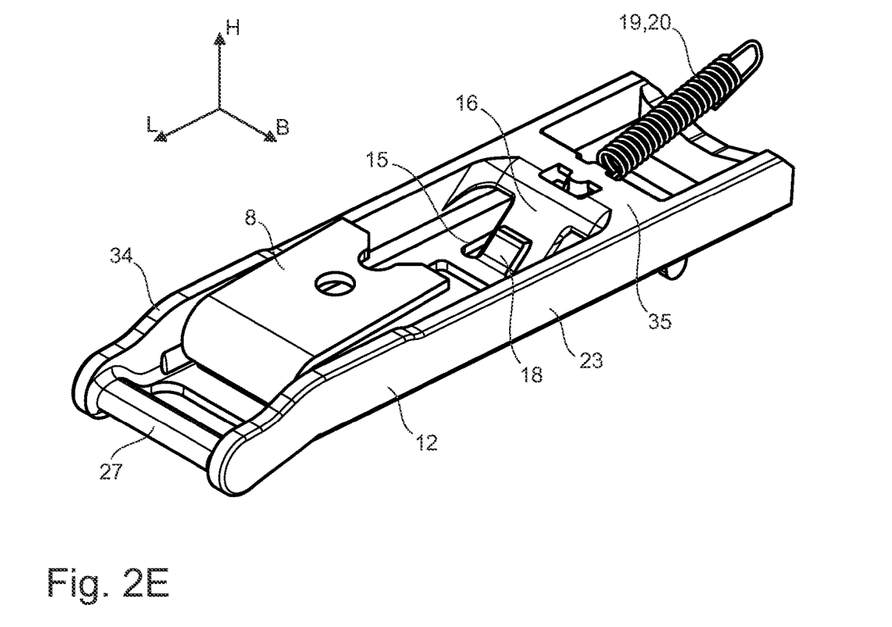
FIG. 2E Sliding carriage element and locking unit in a perspective view according to FIGS. 2A-2D.

FIG. 2E shows the sliding carriage element 12 and the locking unit 8 again in perspective.

Preferably, the locking unit 8 is enclosed by the sliding carriage element 12 as seen in width direction B. More specifically, the sliding carriage element 12 has a first side 33 and a second side 34, which are spaced apart in width direction B, the locking unit 8 being arranged between the first side 33 and the second side 34, in width direction B. This makes it possible for the locking unit 8 to be guided through the sides 33, 34 when the second end 11 is deflected. The two sides 33, 34 are connected to each other, preferably rigidly, by means of the hooking element 27 and a web element 35, whereby the first inclined portion 16 is preferably connected to and supported by the web element 35.

The opening 15, the first inclined portion 16 and the second inclined portion 18 are again shown. Particularly preferably, both the sliding carriage element 12 and the locking unit 8 are symmetrical with respect to a centre plane M, formed by the longitudinal direction L and the height direction H.

Figure 2F:
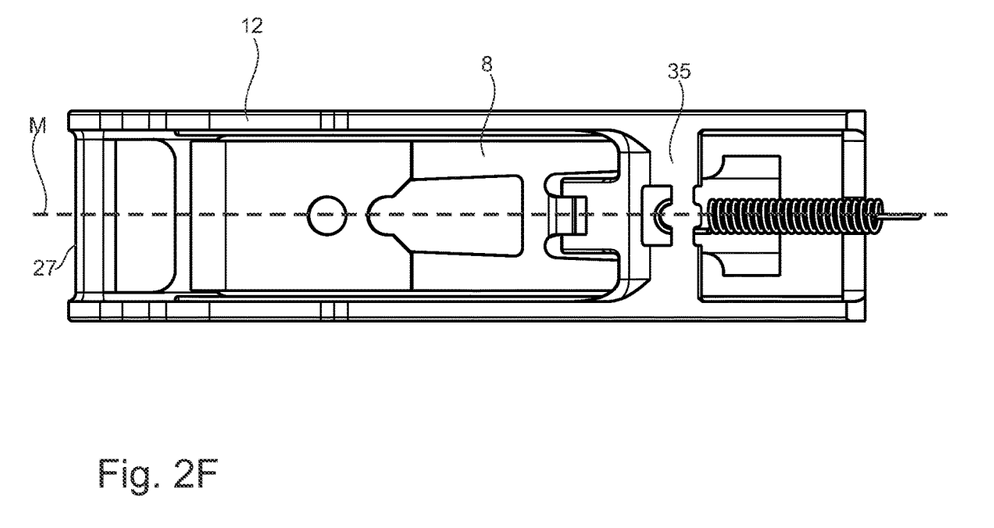
FIG. 2F Sliding carriage element and locking unit according to FIG. 2E in a top view.

In FIG. 2F the sliding carriage element 12 and the locking unit 8 are shown again in a top view.

FIGS. 3A to 3F show a further embodiment in which the return element 19 is formed as a compression spring 21. The functional principle is the same as described so far, but the construction itself is different.

Essentially, the changes are such that tension components are changed to compression components, that is, the tension spring 20 is now a compression spring 21, and actuation of the actuating unit 13 to pull the sliding carriage element 12 is now replaced by actuation of the actuating unit 13 to push the sliding carriage element 12. The inclined parts 16, 18 are now arranged at a second angle 37 to the longitudinal direction L, preferably the second angle 37 being an obtuse angle. Further, the first inclined portion 16 extends from bottom to top through the opening 15.

Figure 3A:
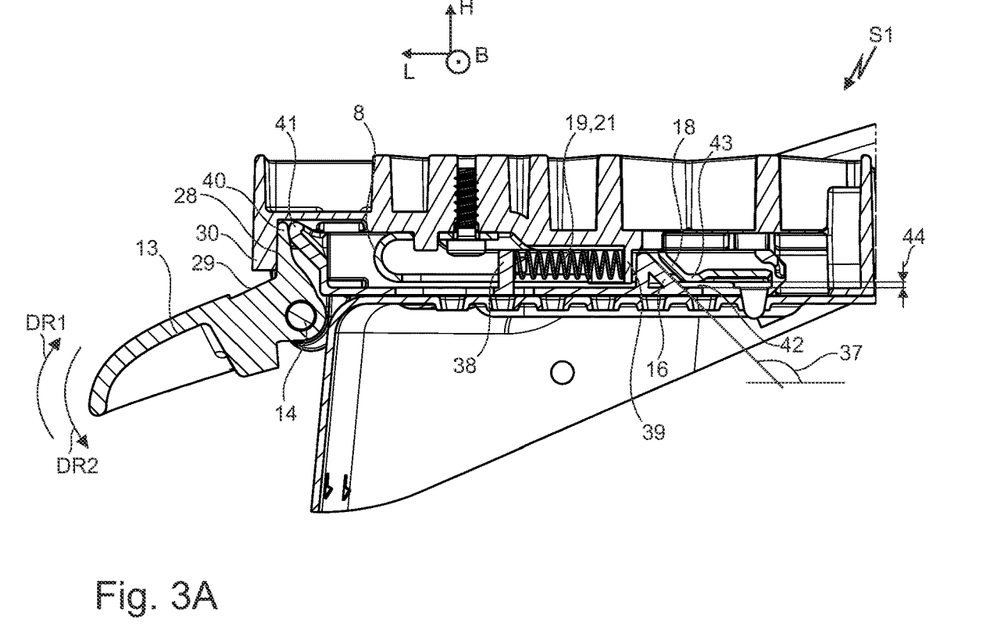
FIG. 3A Locking device in a non-deflected position in a sectional view according to a second embodiment.

Instead of the hook element 26, the actuating unit 13 now comprises a pressure element 40, by means of which the sliding carriage element 12 can be pressed in the longitudinal direction L during a rotation in the first direction of rotation DR1, i.e. clockwise, so that the sliding carriage element 12 moves rearwardly in the longitudinal direction L. Furthermore, the actuating unit 13 has stop elements 28, 29 which interact with a stop 30. The pressure element 40 extends upwards from the first rotary axis 14, as seen in height direction H. As a result, when the actuating unit 13 rotates in the first direction of rotation DR1, the sliding carriage element 12 is pressed backwards in the longitudinal direction L. The sliding carriage element 12 preferably comprises a pressure area 41 which can be contacted with the pressure element 40. The pressure area 41 is preferably designed in such a way that the pressure element 40 can move along it in a guided manner, so that the rotational movement of the actuating unit 13 can be easily transmitted to the sliding carriage element 12.

The return element 19, which is now designed as a compression spring 21, is arranged between a first contact area 38 and a second contact area 39, whereby the first contact area 38 is connected to the sliding carriage element 12 and the second contact area 39 is connected, in particular rigidly connected, to the seat depth adjustment element 5.

When the sliding carriage element 12 is moved relative to the locking unit 8, the contact areas 38, 39 are moved towards each other so that the compression spring 21 is compressed, thereby generating a counterforce which counteracts the sliding movement of the sliding carriage element 12.

Figure 3B:
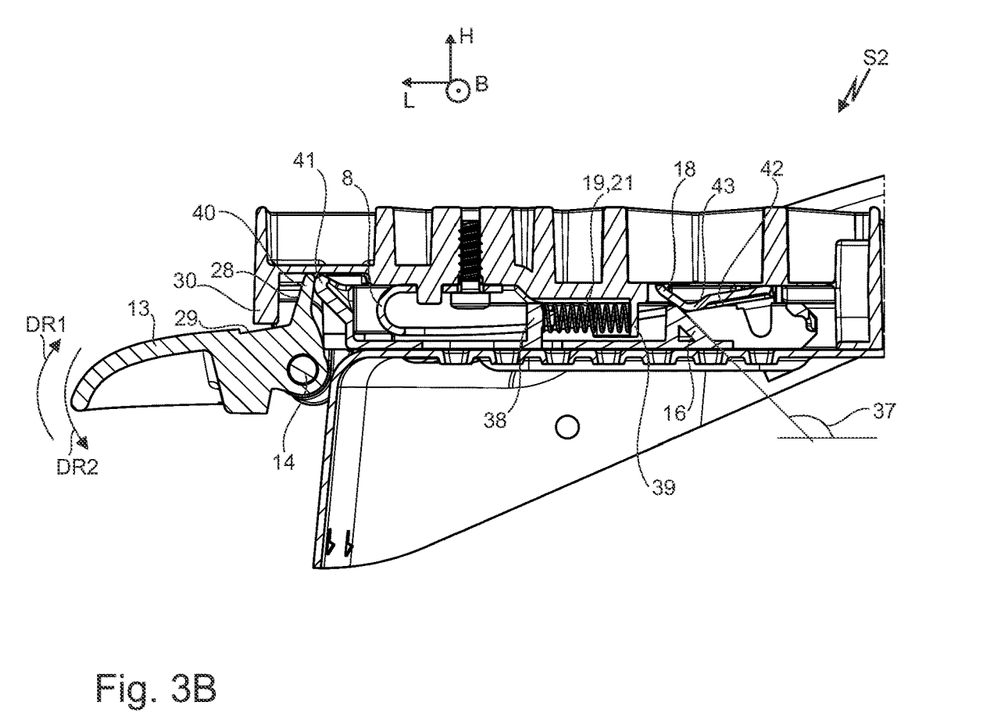
FIG. 3B Locking device according to FIG. 3A in a deflected position.

FIG. 3B shows FIG. 3A in the deflected position S2.

As described, by rotating the actuating unit 13 in the first direction of rotation DR1, the sliding carriage element 12 has been pushed backwards in the longitudinal direction L so that the first inclined portion 16 has also been displaced and is in contact with the second inclined portion 18. For this purpose, it is preferably provided that the sliding carriage element 12 comprises the first inclined portion 16 and the locking unit 8 comprises the opening 15, the first inclined portion 16 extending through the opening 15. Further, the locking unit 8 comprises the second inclined portion 18, which is arranged substantially parallel to the first inclined portion 16. Further preferably, the oblique portions 16, 18 are non-contacting in the non-deflected position S1.

By an actuation of the actuation unit 13, i.e. a rotation in direction DR1, the sliding carriage element 12 is moved backwards in longitudinal direction L and relative to the locking element 8, so that the inclined portions 16, 18 contact and the second inclined portion 18 is guided to the first inclined portion 16, so that the second end 11 is deflected in the height direction H, so that the locking element 9 moves out of the recess 7 into the deflected position S2, so that, seen in the height direction H, the locking element 9 is arranged completely above the recess 7, whereby a displacement of the seat depth adjustment element 5 relative to the seat part frame 2 is possible. Preferably, the inclined parts 16, 18 extend at the second angle 37 to the longitudinal direction L. Preferably, the second angle 37 is an obtuse angle. Preferably, the first inclined portion 16 extends from bottom to top through the opening 15.

Particularly preferably, the locking device 6 comprises a safeguard against an undesired deflection of the locking unit 8 and, accordingly, an undesired release of the locking. For this purpose, as shown in FIG. 3A, a first safety stop 42 and a second safety stop 43 are provided, which are arranged one above the other as seen in the height direction H. The first safety stop 42 is a safety stop 43. The first safety stop 42 is part of the sliding carriage 12, preferably of the inclined portion 16, and the second safety stop 43 is part of the locking unit 8. Preferably, the second safety stop 43 is formed as part of the second inclined portion 18, although other arrangements may also be possible. The stops 42, 43 are arranged at a distance 44 from each other in the height direction H. The distance 44 is such that the locking unit 8 is locked in place. The distance 44 is such that, in the event of a slight deflection of the second end 11, the second safety stop 43 contacts the first safety stop 42 and accordingly prevents further movement in the height direction H. The distance 44 is dimensioned in such a way that the locking element 9 continues to engage in the corresponding recess 7 even during the slight deflection.

FIG. 3B shows all the elements of FIG. 3A, with the locking unit 8 in the deflected position S2. The sliding carriage element 12 is also displaced, the actuating lever 13 is in such a way that the second stop element 29 contacts the stop 30 and the compression spring 21 is compressed.

Figure 3C:
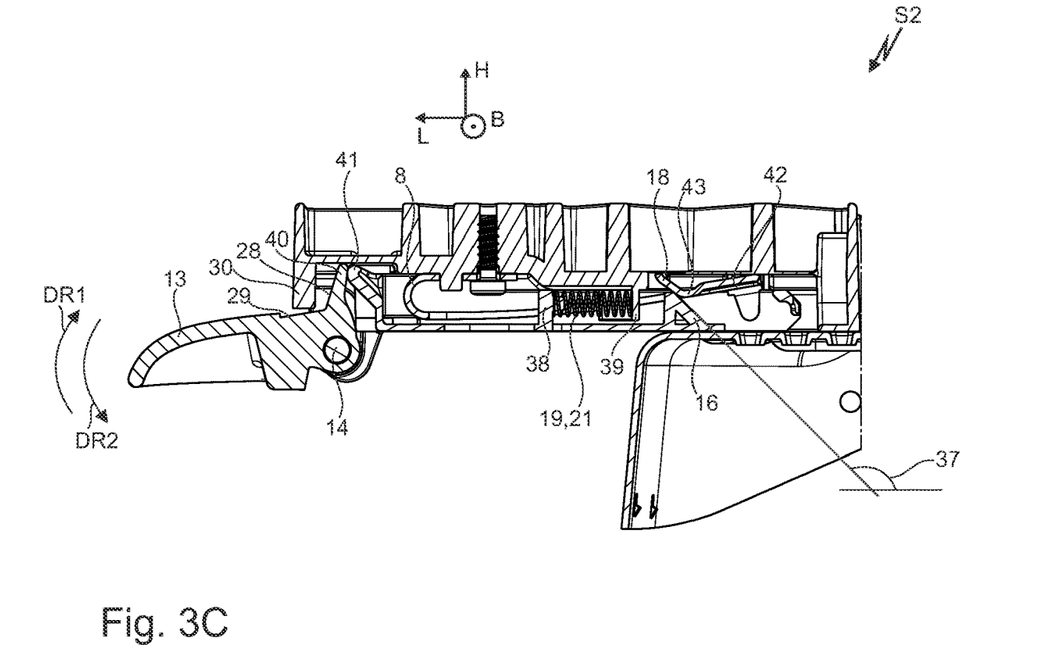
FIG. 3C Locking device according to FIG. 3B in a forward displaced position.

As a result of the fact that the locking element 9 no longer engages in the recess 7, the seat depth adjustment element 5 can be displaced forwards in the longitudinal direction L, whereby the actuating unit 13, the sliding carriage element 12 and the locking unit 8 move equally with the seat depth adjustment element 5 due to their arrangement relative to the seat depth adjustment element 5. A forward displaced position of the seat depth adjustment element 5 is shown in FIG. 3C.

Figure 3D:
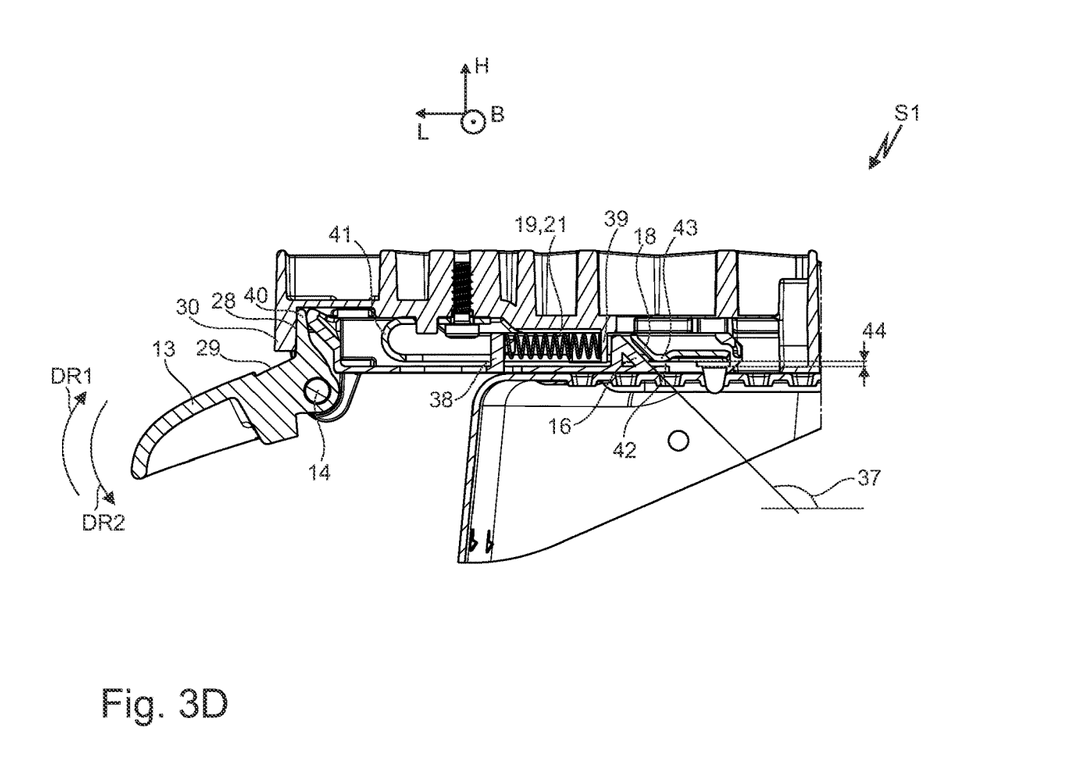
FIG. 3D Locking device according to FIG. 3C in a non-deflected position.

Once the desired position of the seat depth adjustment element 5 has been reached, the actuating unit 13 can be released so that the sliding carriage element 12 can be moved back to the normal position S1 by the stretched tension spring 20, whereby the locking unit 8 can be moved from the deflected position S2 to the non-deflected position S1 and the locking element 9 engages in a further recess 7, whereby the displacement of the seat depth adjustment element 5 is again blocked. This is shown in FIG. 3D.

Figure 3E:
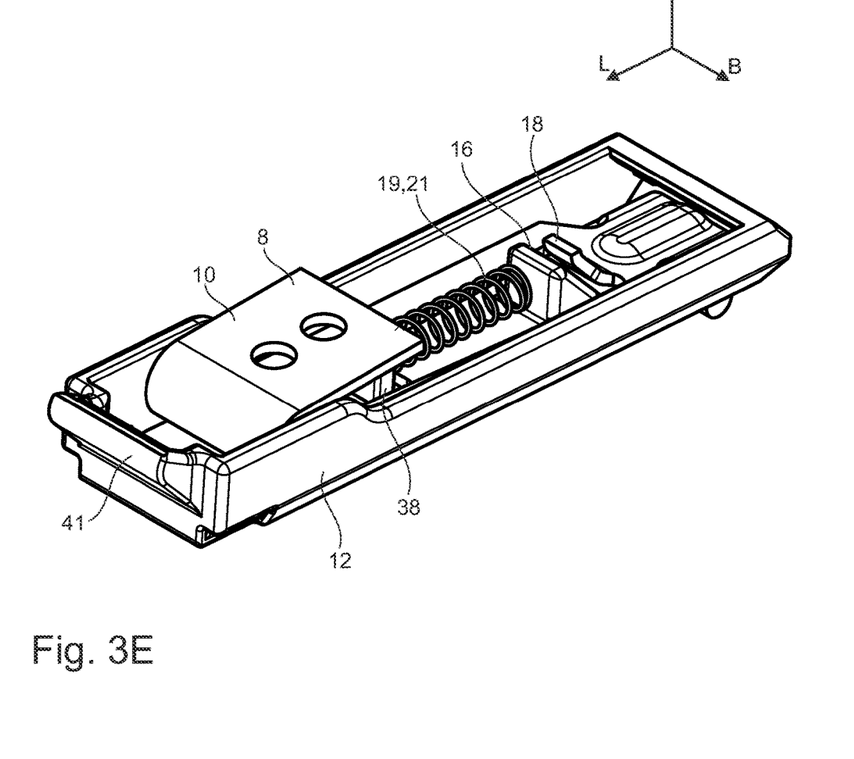
FIG. 3E Sliding carriage element and locking unit in a perspective view according to FIGS. 3A-3D.

FIG. 3E shows the sliding carriage element 12 and the locking unit 8 again in perspective.

Preferably, the locking unit 8 is surrounded by the sliding carriage element 12 as seen in width direction B. More specifically, the sliding carriage element 12 has a first side 33 and a second side 34, which are spaced apart in width direction B, the locking unit 8 being arranged between the first side 33 and the second side 34 in width direction B. This makes it possible for the locking unit 8 to be guided through the sides 33, 34 when the second end 11 is deflected. The two sides 33, 34 are connected to each other, preferably rigidly, by means of the pressure area 41 and a web element 35.

The opening 15, the first inclined portion 16 and the second inclined portion 18 are also shown. Particularly preferably, both the sliding carriage element 12 and the locking unit 8 are symmetrical to a centre plane M formed by the longitudinal direction L and the height direction H.

Figure 3F:
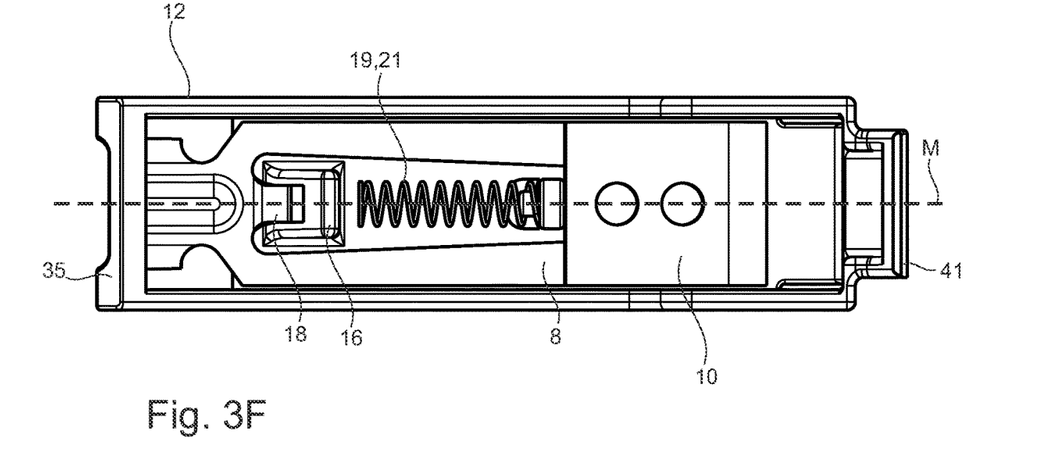
FIG. 3F Sliding carriage element and locking unit according to FIG. 3E in a top view.

In FIG. 3F the sliding carriage element 12 and the locking unit 8 are shown again in a top view.

All features disclosed in the application documents are claimed to be inventive if they are individually or in combination new compared to the state of the art.

REFERENCE LIST

1 Vehicle seat
2 Seat part frame
3 Backrest frame
4 Seat depth adjustment
5 Seat depth adjustment element
6 Locking device
7 Recess
8 Locking unit
9 Locking element
10 first end
11 second end
12 Sliding carriage element
13 Actuating unit
14 first rotation axis
15 opening
16 first inclined portion
17 Seat depth adjustment element guide
18 Second inclined part
19 Return element
20 Tension spring
21 compression spring
22 Screw connection
23 U-shaped connection
24 first leg
25 Second leg
26 hook element
27 hooking element
28 first stop element
29 second stop element
30 stop
31 first attachment area
32 second attachment area
33 first side
34 second side
35 web element
36 first angle
37 second angle
38 first contact area
39 second contact area
40 Pressure element
41 Pressure area
42 first safety stop
43 Second safety stop
44 Distance
S1 non-deflected position, normal position
S2 deflected position
Z1 first state
Z2 second state
DR1 first direction of rotation
DR2 second direction of rotation
M centre plane
H Height direction
L longitudinal direction
B Width direction

The invention claimed is:

1. A vehicle seat, wherein the vehicle seat has a seat part frame and a seat back adjustment with a seat depth adjustment element, wherein the seat back adjustment element can be displaced relative to the seat part frame, wherein a locking device is provided, which is designed to lock a displacement of the seat depth adjustment element relative to the seat part frame by engagement of a locking element of the locking element in at least one recess of the seat part frame, wherein the locking device comprises:

a locking unit which has a first end, which is arranged rigidly on the seat depth adjustment element, and a second end, which can be deflected in a height direction, the second end engaging the locking element in the recess in a non-deflected position and the locking element being separated from the recess in a deflected position, and a sliding carriage element which is provided and designed to deflect the second end of the locking unit when the sliding carriage element is displaced relative to the locking unit.

2. The vehicle seat according to claim 1, wherein in the non-deflected position the first end of the locking unit is above the second end of the locking unit as seen in the height direction.

3. The vehicle seat according to claim 1, wherein the sliding carriage element is at least operatively connected to an actuating unit, the sliding carriage element being displaceable relative to the locking unit when the actuating unit is actuated.

4. The vehicle seat according to claim 3, wherein the actuating unit is connected to the seat depth adjustment element so as to be rotatable about a first rotation axis.

5. The vehicle seat according to claim 1, wherein in a normal position of the sliding carriage element, the second end is in the non-deflected position and, when the sliding carriage element is displaced, the second end can be deflected.

6. The vehicle seat according to claim 1, wherein the locking unit has an opening through which a first inclined portion of the sliding carriage element extends, and wherein the locking unit has a second inclined portion which can make contact with the first inclined portion in such a way that, when the sliding carriage element is displaced, the inclined portions move relative to one another.

7. The vehicle seat according to claim 1, wherein a return element is provided which is designed to counteract the displacement of the sliding carriage element relative to the locking unit.

8. The vehicle seat according to claim 7, wherein the return element is a tension spring which is connected to the seat depth adjustment element and the sliding carriage element.

9. The vehicle seat according to claim 7, wherein the return element is a compression spring which is connected to the seat depth adjustment element and the sliding carriage element.

10. The vehicle seat according to claim 1, wherein the locking unit is enclosed by the sliding carriage element when viewed in a width direction.

11. The vehicle seat according to claim 1, wherein the locking unit is a leaf spring element.

* * * * *